United States Patent [19]

Kanaya et al.

[11] Patent Number: 4,782,567
[45] Date of Patent: Nov. 8, 1988

[54] WORKPIECE TRANSFERRING, POSITIONING AND MACHINING SYSTEM

[75] Inventors: Koutaro Kanaya; Fugio Ueno; Seiichi Aihara; Ryuichi Toyama, all of Sayama, Japan

[73] Assignee: Honda Giken Kogyo Kabushiki Kaisha, Tokyo, Japan

[21] Appl. No.: 31,742

[22] Filed: Mar. 30, 1987

[51] Int. Cl.⁴ .............................................. B23B 5/34
[52] U.S. Cl. ....................................... 29/33 P; 29/563; 82/2.7; 82/40 R; 408/7; 414/225; 414/416; 414/754; 901/6; 901/7
[58] Field of Search .................. 82/2 R, 2.5, 2.7, 28 R, 82/36 A, 40 R; 29/33 P, 563; 408/7, 13; 414/222, 225, 226, 416, 754; 901/6, 7

[56] References Cited

U.S. PATENT DOCUMENTS

| | | | |
|---|---|---|---|
| 4,097,984 | 7/1978 | Petrov | 29/563 |
| 4,230,003 | 10/1980 | Oeming | 82/2.7 |
| 4,280,775 | 7/1981 | Wood | 408/3 |
| 4,288,180 | 9/1981 | Trevarrow | 408/2 |
| 4,316,398 | 2/1982 | Link et al. | 82/2.7 |
| 4,662,043 | 5/1987 | Stone et al. | 29/33 P |
| 4,697,318 | 10/1987 | Wickham et al. | 29/33 P |

FOREIGN PATENT DOCUMENTS 2350922  2/1977  France .................................. 408/7

Primary Examiner—Frederick R. Schmidt
Assistant Examiner—William E. Terrell
Attorney, Agent, or Firm—Birch, Stewart, Kolasch & Birch

[57] ABSTRACT

A system for transferring, positioning and machining a workpiece includes a transfer device for transferring the workpiece to a prescribed position, a positioning device disposed in the prescribed position for positioning the workpiece, a machine tool for machining the workpiece, and a delivery robot disposed in the prescribed position for delivering the workpiece to the machine tool. The positioning device is used to position workpieces successively. Therefore, it is not necessary to provide positioning devices which would otherwise be associated with respective workpieces. The positioning device includes a positioning pin which is displaceable toward and away from a workpiece. Since the positioning pin is not held against the workpiece at all times, the positioning pin is prevented from being damaged or broken by physical interference with surface irregularities of the workpiece.

17 Claims, 10 Drawing Sheets

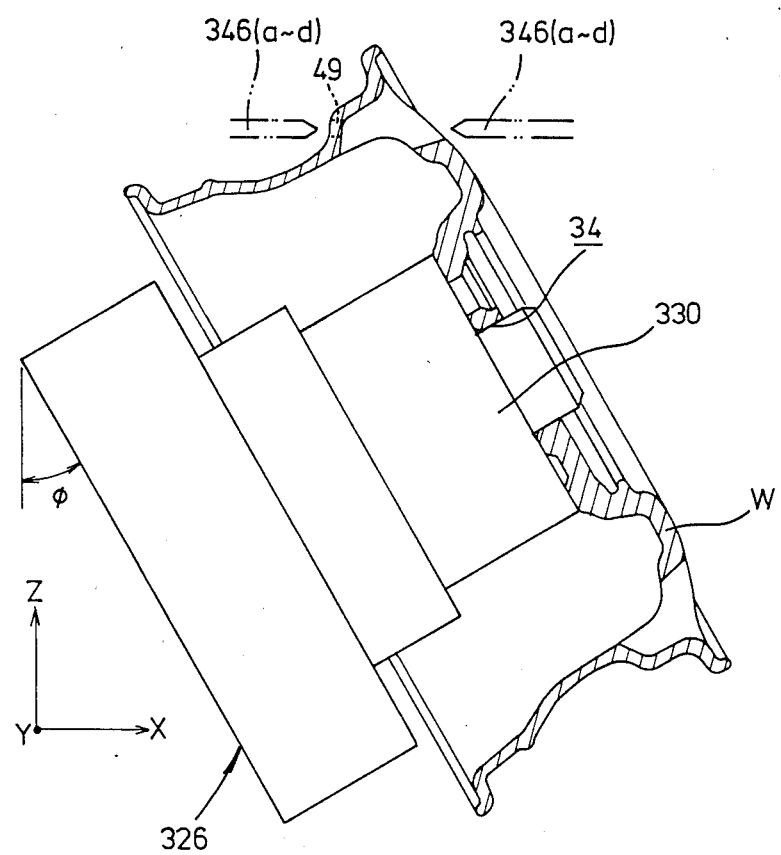

WORKPIECE TRANSFERRING, POSITIONING AND MACHINING SYSTEM

BACKGROUND OF THE INVENTION

The present invention relates a workpiece transferring, positioning and machining system, and more particularly to a workpiece handling system for transferring a workpiece such as an automobile wheel from a stocker to a prescribed position, positioning the workpiece with a positioning device disposed in the prescribed position, and then delivering the workpiece to a machine tool with a delivery robot for desired machining operation on the workpiece, the workpiece handling system being arranged to reduce the space taken up by the machining line and lower the cost of equipment.

Various automotive parts are generally mass-produced by continuous production line processes. For example, an automobile wheel is manufactured by first producing an intermediate product by casting or forging, and conveying the product to a machine tool where it is finished on its outer and inner peripheral surfaces and formed with fastening holes for attaching the wheel to a drive axle and a valve hole.

The wheel has a plurality of hollows or recesses known as ornamental holes. The fastening holes are required to be defined accurately in a certain positional relation to the ornamental holes. Various jigs have been employed to position the wheel with respect to the machine tool.

It is known to position a wheel taken from a stocker on a jig pallet, transfer the wheel and the jig pallet to a prescribed position with a transfer device, and thereafter deliver the wheel to a machine tool with a delivery means disposed in the prescribed position. Since the wheel is positioned by the jig pallet, the wheel is retained in position against displacement during delivery, and hence can be delivered accurately to the machine tool.

For positioning the wheel on the jig pallet, it needs to be positioned by the worker or an automatic positioning device is required to position the wheel. As wheels are successively processed on the production line, the wheels that are positioned on the respective jig pallets are successively arranged on a transfer path between the stocker and the machine tool. Therefore, many jig pallets are necessary to position the respective wheels, resulting in a costly installation. After the jig pallets have been moved to the prescribed position, they have to be moved back to the stocker along a separate delivery path. Thus, where the jig pallets are employed, the cost of the jig pallets themselves and the delivery path is high, and a considerable space is needed by the delivery path.

Japanese Laid-Open Patent Publication No. 55-97886 discloses a jig device designed to eliminate the above drawbacks. The disclosed jig device includes a turntable disposed in a predetermined position on a wheel transfer path for turning a wheel and a positioning pin located in the predetermined position for engaging in the valve hole defined in the wheel. The wheel which has reached the predetermined position on the transfer path is placed on the turntable and turned thereby in one direction. The positioning pin then slidably contacts the wheel as it turns until the pin engages in the valve hole, whereupon the wheel is positioned. Thereafter, the positioned wheel is transferred to a machine tool and machined thereby as desired. The jig device of the above structure only needs to be installed on the transfer path near the machine tool, with the result that the production line can be reduced.

The above jig device is however disadvantageous in that if the wheel has irregularities on the surface for sliding contact with the positioning pin, the positioning pin interferes with the surface irregularities. The positioning pin may fail to position the wheel accurately, or may be broken by the surface irregularities. Accordingly, wheel shapes that can be positioned by the jig device are limited.

SUMMARY OF THE INVENTION

It is an object of the present invention to provide a workpiece transferring, positioning and machining system which can reduce the size of a workpiece production line and lower the cost of equipment on the workpiece production line, and which can position a wider variety of wheel shapes with accuracy.

Another object of the present invention is to provide a system for transferring, positioning and machining a workpiece, comprising a transfer device for transferring the workpiece to a prescribed position, a positioning device disposed in the prescribed position for positioning the workpiece, a machine tool for machining the workpiece, and a delivery robot disposed in the prescribed position for delivering the workpiece to the machine tool.

Still another object of the present invention is to provide a system for transferring, positioning and machining a workpiece, wherein the positioning device comprises a holder mechanism for holding the workpiece, turning means for turning the workpiece, detector means disposed near the workpiece for detecting the workpiece as it is turned closely to or away from the detector means and for generating a detected signal, a positioning pin displaceable toward the workpiece for engaging a portion of the workpiece, and displacing means responsive to the detected signal from the detector means for displacing the workpiece toward or away from the workpiece.

Yet another object of the present invention is to provide a system for transferring, positioning and machining a workpiece which has a reference positioning hole for engaging a positioning pin.

Yet still another object of the present invention is to provide a system for transferring, positioning and machining a workpiece, wherein the workpiece has a hole at its center of turning movement, and the holder mechanism has an engaging portion for engaging in the hole.

A further object of the present invention is to provide a system for transferring, positioning and machining a workpiece, wherein the positioning device comprises a first positioning mechanism disposed on the transfer device, and a second positioning mechanism disposed on the delivery robot for cooperating with the first positioning mechanism in positioning the workpiece.

A still further object of the present invention is to provide a system for transferring, positioning and machining a workpiece, wherein the turning means turns one of the first and second positioning mechanisms to displace the workpiece for positioning the workpiece with respect to the other positioning mechanism.

A yet further object of the present invention is to provide a system for transferring, positioning and machining a workpiece, wherein one of the positioning mechanisms has an engaging pin for engaging the workpiece and the other positioning mechanism has the detector means and the positioning pin.

A yet still further object of the present invention is to provide a system for transferring, positioning and machining a workpiece, wherein the detector means and the positioning pin are located at an angular spacing in a range in which the reference positioning hole is moved by the positioning mechanism.

Another object of the present invention is to provide a system for transferring, positioning and machining a workpiece, wherein the angular spacing between the detector means and the positioning pin is equal to an angular spacing between recesses defined in the range of movement of the reference positioning hole, the displacing means being arranged to displace the positioning pin away from the workpiece when the detector means detects the recesses and to displace the positioning pin toward the workpiece when the detector means detects the recesses.

Still another object of the present invention is to provide a system for transferring, positioning and machining a workpiece, wherein the turning means is mounted on the holder mechanism for turning the workpiece with respect to the holder mechanism.

Yet another object of the present invention is to provide a system for transferring, positioning and machining a workpiece, wherein the delivery robot comprises posture changing means having the second positioning mechanism for changing the posture of the workpiece, and delivery means for gripping the workpiece with its posture changed by the posture changing means and delivering the workpiece to the machine tool.

Yet still another object of the present invention is to provide a system for transferring, positioning and machining a workpiece, wherein the delivery means has a plurality of jig units displaceable toward the machine tool while holding the workpiece.

A further object of the present invention is to provide a system for transferring, positioning and machining a workpiece, wherein the jig units include a first jig unit directed toward the posture changing means and a second jig unit directed toward the machine tool, the first and second jig units being positionally interchangeable with each other.

A yet further object of the present invention is to provide a system for transferring, positioning and machining a workpiece, wherein the delivery robot has the second positioning mechanism and comprises a plurality of jig units displaceable toward the machine tool while holding the workpiece.

A still further object of the present invention is to provide a system for transferring, positioning and machining a workpiece, wherein the jig units include a first jig unit directed toward the posture changing means and a second jig unit directed toward the machine tool, the first and second jig units being positionally interchangeable with each other.

A yet still further object of the present invention is to provide a system for transferring, positioning and machining a workpiece, wherein the machine tool comprises a machining unit for machining the workpiece, and a jig unit having first and second jigs directed toward the delivery robot and the machining unit, respectively, the first and second jigs being positionally interchangeable with each other while holding the workpiece.

Another object of the present invention is to provide a system for transferring, positioning and machining a workpiece, wherein the machining unit comprises a plurality of machining portions having a plurality of replaceable tools for simultaneously machining a plurality of areas of the workpiece.

Still another object of the present invention is to provide a system for transferring, positioning and machining a workpiece, wherein the machine tool comprises first and second machining units disposed in confronting relation to each other for machining the workpiece, and jig units disposed between the first and second machining units and directable respectively toward the delivery robot and the first and second machining units while holding the workpiece.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 9 is a view showing valve hole machining in the third machining station shown in FIG. 1.

DESCRIPTION OF THE PREFERRED EMBODIMENT

Figure 1:
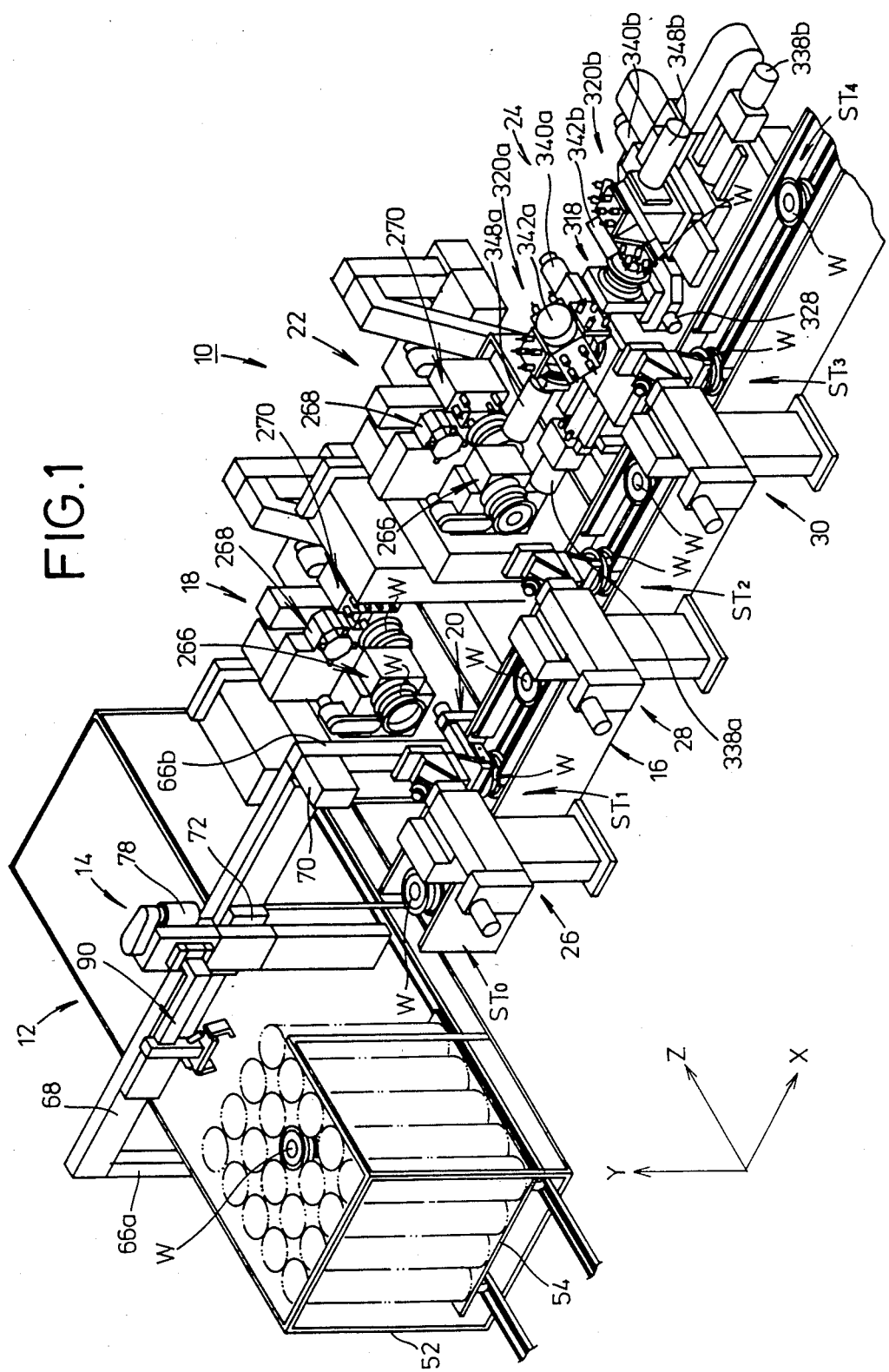
FIG. 1 is a perspective view of a workpiece transferring, positioning and machining system according to the present invention.

As shown in FIG. 1, a production or machining line 10 in which a workpiece transferring, positioning and machining system of the invention is incorporated machines automobile wheels W.

The machining line 10 includes a wheel stocker 12 for storing wheels W, a wheel pick-up robot 14 for picking up wheels W from the wheel stocker 12, and a transfer device 16 for transferring the wheels W. On one side of the transfer device 16, there are disposed a first machine tool 18 and a wheel reversal robot 20 in a first machining station ST1, a second machine tool 22 in a second machining station ST2, and a third machining tool 24 in a third machining station ST3. The machining stations ST1 through ST3 include first through third loading robots 26, 28, 30, respectively, disposed on the other side of the transfer device 16.

Figure 2A:
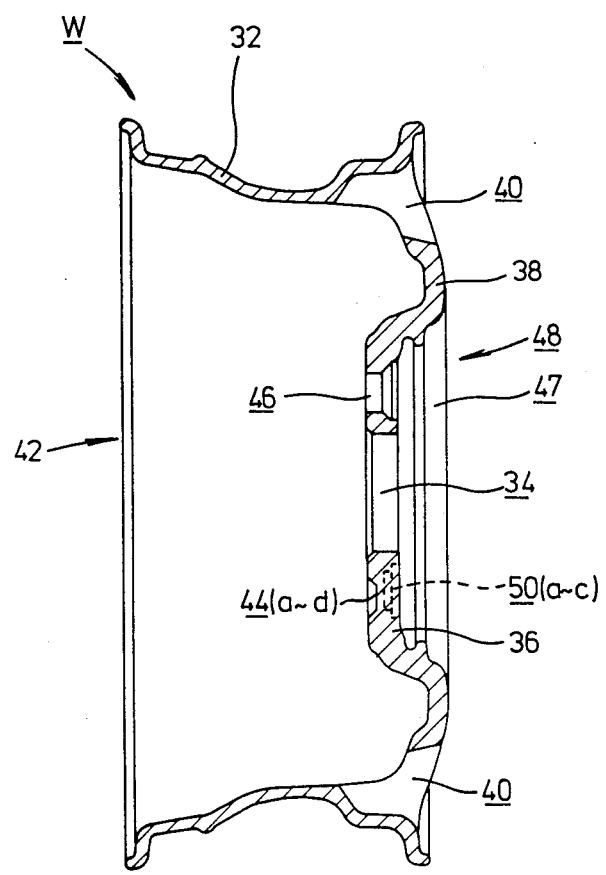
FIGS. 2a and 2b are cross-sectional and side elevational views of an automobile wheel to be machined by the workpiece transferring, positioning and machining system of the invention.
Figure 2B:
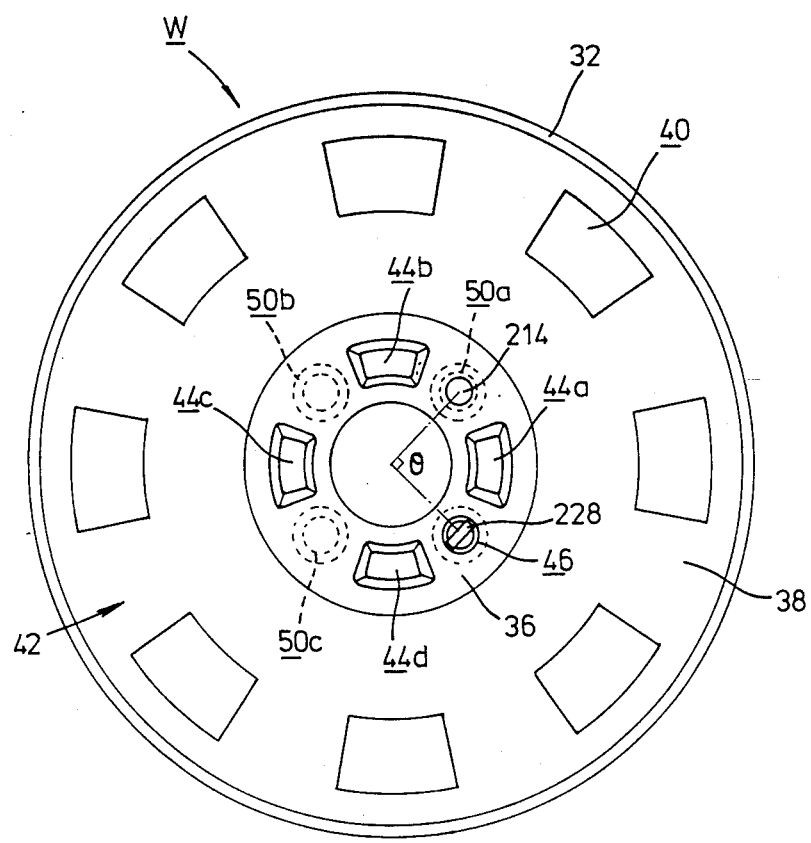

Each of the wheels W stored in the wheel stocker 12 is of a shape given by casting or forging as shown in FIGS. 2a and 2b. More specifically, the wheel W which is an intermediate product when stored in the wheel stocker 12 has an outer rim 32, a hub 36 having an axial hole 34 through which a drive axle extends, and a wheel disc 38 interconnecting the rim 32 and the hub 36, the wheel disc 38 having a plurality of ornamental holes 40. The hub 36 has four recesses 44a through 44d defined on its surface facing the inner side 42 of the wheel W, the recesses 44a through 44d are angularly spaced 90 degrees. The hub 36 also has a reference hole 46 serving as a fastening hole for securing the wheel W to the drive axle. The hub 36 has recesses 50a through 50c defined on its surface facing the outer side 48 of the wheel W, the recesses 50a through 50c and the reference hole 46 are angularly spaced 90 degrees. The recesses 50a through 50c will be bored into fastening holes at a later time.

Figure 3:
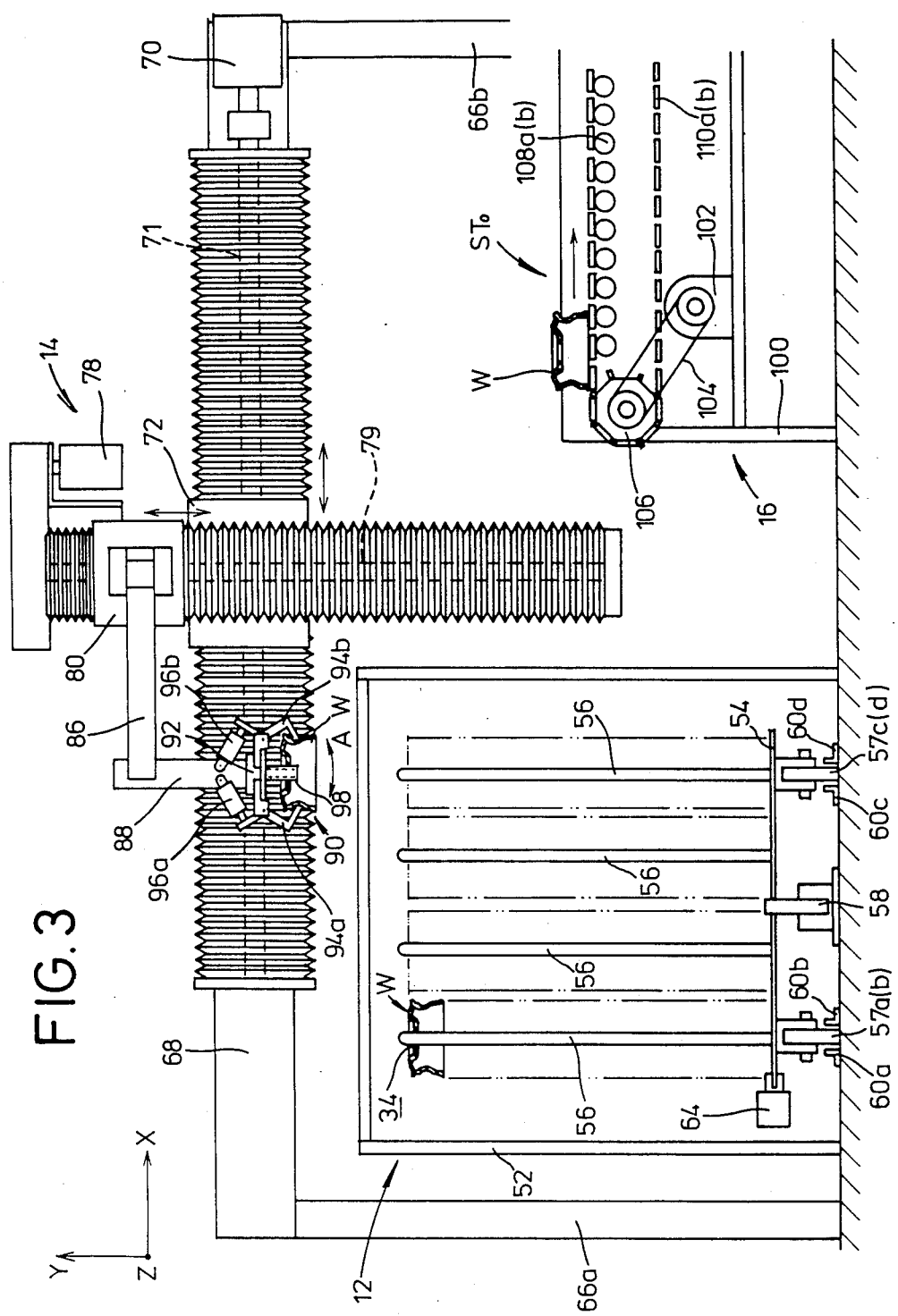
FIG. 3 is a an elevational view of a wheel pick-up robot, a wheel stocker, and a transfer device shown in FIG. 1.

As illustrated in FIG. 3, the wheel stocker 12 has a mobile base 54 surrounded by a frame 52. A number of wheels W are stacked on the mobile base 54 with rods 56 erected on the mobile base 54 and inserted through the axial holes 34 of the wheels W. The mobile base 54 has rollers 57a through 57d and movable in the direction of the arrow Z (FIG. 1) along guide rails 60a, 60b, 62a, 62b by a mobile base feeder 58. The mobile base 54 is held in a prescribed position by a mobile base positioning device 64 disposed on one side of the wheel stocker 12.

The wheel pick-up robot 14 serves to convey a wheel W from the wheel stocker 12 into a wheel charging station ST0 in the transfer device 16. The wheel pick-up robot 14 includes vertical posts 66a, 66b and a horizontal beam 68 supported on the posts 66a, 66b above the wheel stocker 12. On the beam 68, there is mounted a cross table 72 which is movable along a ball screw 71 in the direction of the axis X by means of a motor 70. A support body 80 mounted on the cross table 72 is movable along a ball screw 71 in the direction of the arrow Y by means of a motor 78. The support body 80 supports thereon a first arm 86 extending in the direction of the arrow X and having a distal end to which a second arm 88 is attached that extends vertically downwardly in the direction of the arrow Y. A hand 90 is installed on the lower end of the second arm 88 for holding a wheel W. The hand 90 has a pair of chuck fingers or jaws 94a, 94b pivotally attached to an attachment plate 92 fixed to the lower end of the second arm 88. The chuck fingers 94a, 94b are openably and closably movable in the direction of the arrow A by means of cylinders 96a, 96b. A cylindrical positioning member 98 for fitting over the upper end of one of the rods 56 of the wheel stocker 12 is disposed between the chuck fingers 94a, 94b.

The transfer device 16 is positioned alongside of the wheel stocker 12 and extends in the direction of the arrow X. The transfer device 16 has a motor 102 mounted on a base 100 for rotating a sprocket 106 through a drive belt 104. The sprocket 106 extends in the direction of the arrow X and engages two conveyor belts 110a, 110b supported on rollers 108a, 108b disposed on opposite lateral sides of the transfer device 16.

Figure 4:
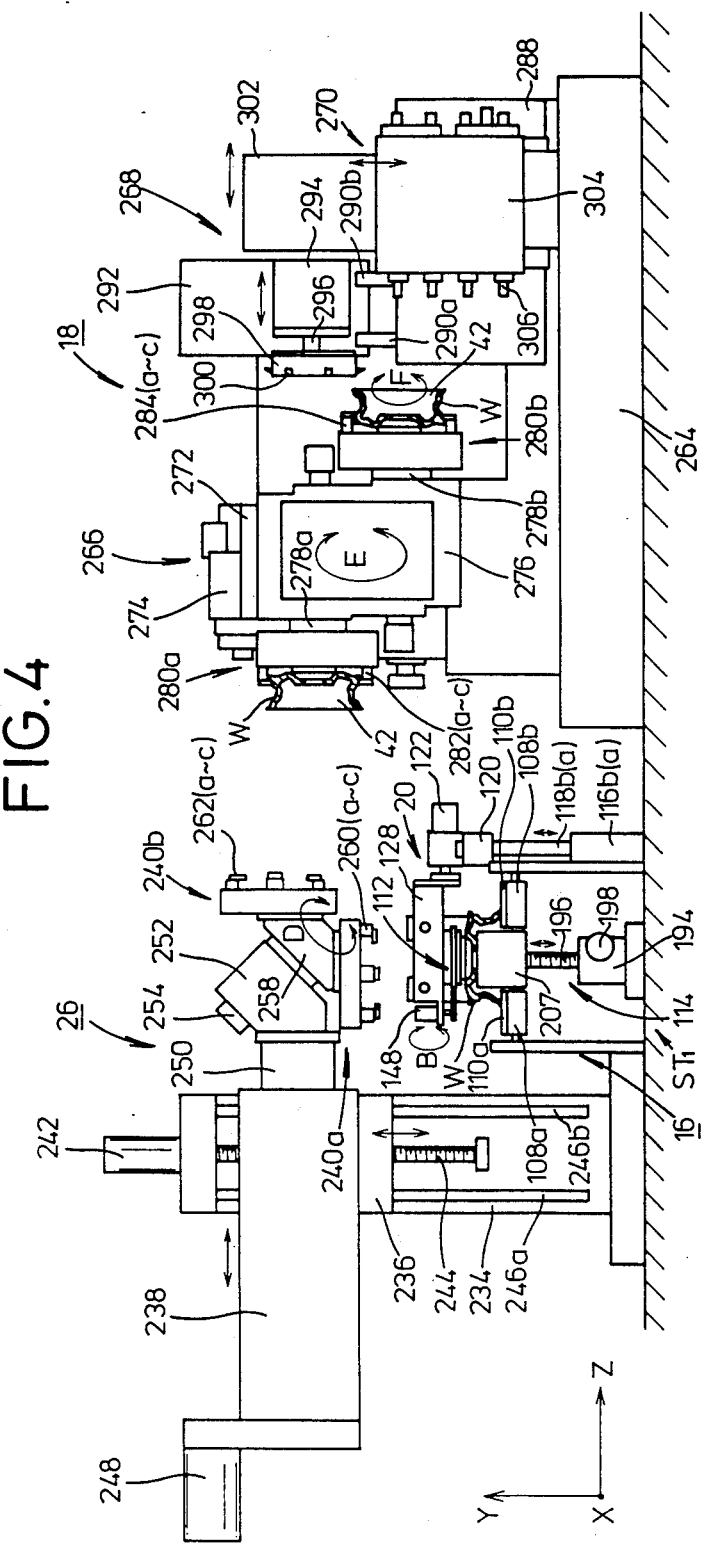
FIG. 4 is an elevational view of a first machining station shown in FIG. 1.

As shown in FIG. 4, the first machining station ST1 has upper and lower positioning mechanisms 112, 114 for positioning a workpiece W. The upper positioning mechanism 112 is mounted on the wheel reversal robot 20 which turns a wheel W upside-down. The lower positioning mechanism 114 is disposed in the transfer device 16 and cooperates with the upper positioning mechanism 112 in positioning a wheel W. The first loading robot 26 for feeding a wheel W toward the first machine tool 18 is disposed on one side of the transfer device 16, and the first machine tool 18 for finishing the inner side 42 of a wheel W is disposed on the other side of the transfer device 16.

Figure 5:
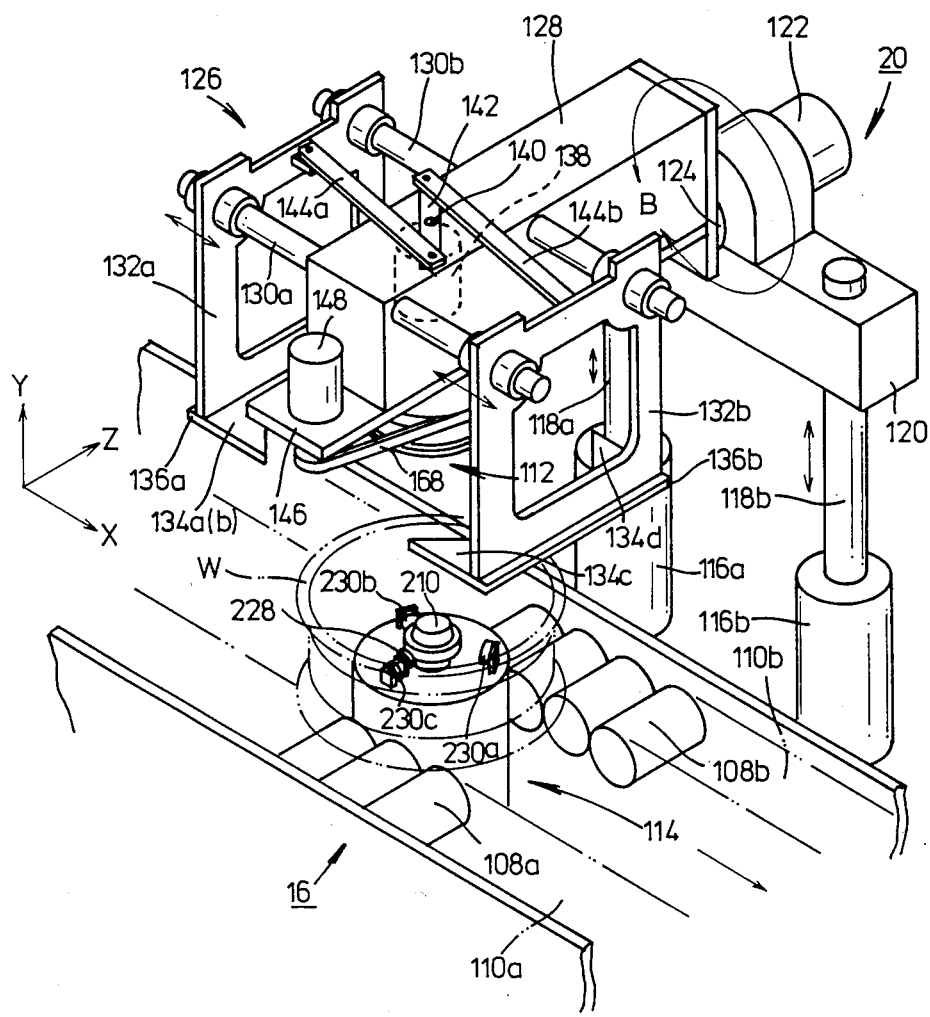
FIG. 5 is a perspective view of a wheel reversal robot and a positioning device in the first machining station shown in FIG. 1.

As shown in FIG. 5, the wheel reversal robot 20 is supported by two cylinders 116a, 116b on one side of the transfer device 16 for vertical movement in the direction of the arrow Y. The cylinders 116a, 116b have piston rods 118a, 118b extending in the direction of the arrow Y and include upper ends attached to a support member 120 on which a motor 122 is mounted. The motor 122 has a drive shaft 124 coupled to a support body 128 disposed above the transfer device 16 and constituting a jig unit 126. The jig unit 126 is angularly movable through 180 degrees in the direction of the arrow B by the motor 122.

Two parallel guide bars 130a, 130b extending in the direction of the arrow X are supported on and extend through the support body 128. Attachment plates 132a, 132b are movably mounted on the opposite end portions of the guide bars 130a, 130b for movement in the direction of the arrow X. Holder plates 136a, 136b are attached to the lower ends of the attachment plates 132a, 132b, respectively, the holder plates 136a, 136b having chuck fingers or jaws 134a, 134b and 134c, 134d. The support body 128 houses therein a motor 138 having a drive shaft 140 joined to a link 142 disposed on the upper surface of the support body 128. The link 142 has opposite ends pivotally coupled to the attachment plates 132a, 132b through links 144a, 144b. Therefore, the attachment plates 132a, 132b and the holder plates 136a, 136b can be moved toward and away from each other when the motor 138 is energized.

Figure 6:
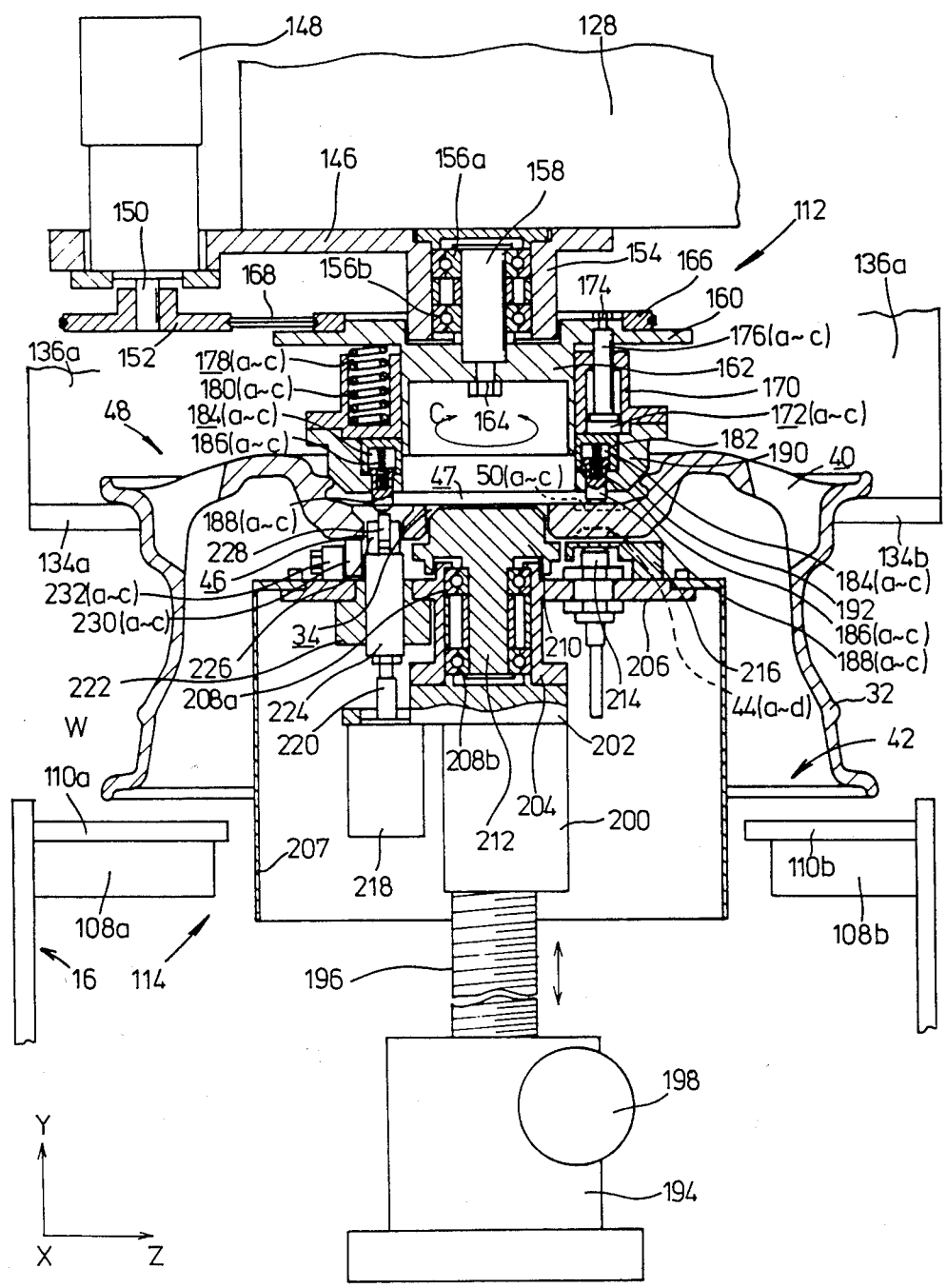
FIG. 6 is a cross-sectional view of the positioning device illustrated in FIG. 5.

As illustrated in FIG. 6, the upper positioning mechanism 112 is attached by an attachment plate 146 to the lower surface of the support body 128 of the wheel reversal robot 20. The attachment plate 146 has one end projecting horizontally from an end of the support body 128 and supporting on its upper surface a motor 148 having a drive shaft 150 on which a pulley 152 is mounted. The attachment plate 146 has an integral cylindrical bearing bracket 154 on the lower surface of the other end of the attachment plate 146. A shaft 158 is rotatably supported in the bearing bracket 154 by means of bearings 156a, 156b. The shaft 158 extends downwardly from the bearing bracket 154, and a cylindrical drum 162 having an upper flange 160 is connected by a bolt 164 to the downwardly projecting end of the shaft 158. A pulley 166 is securely fitted over the upper surface of the flange 160, and operatively coupled to the pulley 152 by a V-belt 168. Thus, the drum 162 can be rotated in the direction of the arrow C upon energization of the motor 148.

A substantially cylindrical, thick joint sleeve 170 is slidably fitted over the drum 162. The joint sleeve 170 has three holes 172a through 172c defined in a side wall thereof and extending upwardly toward the flange 160 of the drum 162. Stopper pins 176a through 176c with upper ends fixed to the flange 160 by bolts 174 engage respectively in the holes 172a through 172c. The side wall of the joint sleeve 170 also has three bottomed holes 178a through 178c defined away from the flange 160 and alternating with the holes 172a through 172c. Coil springs 180a through 180c are disposed respectively in the holes 178a through 178c and have upper ends held against the lower surface of the flange 160. Therefore, the joint sleeve 170 is joined to the drum 162 through the stopper pins 176a through 176c, and is normally urged downwardly away from the flange 160 by the coil springs 180a through 180c.

A thick ring member 182 fitted over the drum 162 is attached to the lower surface of the joint sleeve 170. The ring member 182 has three angularly spaced bottomed holes 184a through 184c defined upwardly toward the joint sleeve 170. Engaging pins 188a through 188c with respective coil springs 186a through 186c engage in the holes 184a through 184c, respectively. A centering piece 190 is attached to the lower surface of the joint sleeve 170 in covering relation to the outer circumferential surface of the ring member 182. The centering piece 190 has a tapered lower peripheral surface 192 having a diameter such that it engages in a large-diameter cavity 47 defined on the outer side 48 of the wheel W. The engaging pins 188a through 188c have lower ends projecting downwardly from the lower surface of the centering piece 190 under the bias of the coil springs 186a through 186c.

The lower positioning mechanism 114 is disposed in confronting relation to the upper positioning mechanism 112 in the transfer device 16 at the first machining station ST1. The lower positioning mechanism 114 is supported on a base 194 by means of a ball screw 196, and is movable toward the upper positioning mechanism 112 between the rollers 108a, 108b when a motor 198 mounted on the base 194 is energized. The ball screw 196 has an upper end to which an attachment plate 202 is attached by a joint 200. Another attachment plate 206 with an integral bearing bracket 204 is attached to the upper surface of the attachment plate 202. A cylindrical dust cover 207 is mounted on the peripheral surface of the attachment plate 206 in surrounding relation to the joint 200 for protecting the upper portion of tee lower positioning mechanism 114. The shaft 212 of a centering piece 210 is rotatably supported by bearings 208a, 208b in the bearing bracket 204 of the attachment plate 206. The centering piece 210 has such a diameter that it will fit in the axial hole 34 of the wheel W.

A proximity switch 214 is mounted on the attachment plate 206 and positioned over the upper surface thereof, the proximity switch 214 being spaced a distance from the center of the centering piece 210. The proximity switch 214 detects a metallic material of the wheel W as it approaches the proximity switch 214. The distance between the proximity switch 214 and the center of the centering piece 210 is equal to the distance between the center of the axial hole 34 of the wheel W and the center of each of the recesses 44a through 44d. The proximity switch 214 has a detecting surface protected by a protective cover 216 mounted on the attachment plate 206.

A cylinder 218 is installed on the attachment plate 202 surrounded by the dust cover 207 and has a piston rod 220 coupled to a positioning pin 224 projecting upwardly through a guide member 222 mounted on the attachment plate 206. A roller 228 is rotatably supported on the upper end of the positioning pin 224 by means of a bracket 226. The distance between the roller 228 and the center of the centering piece 210 is equal to the distance between the center of the axial hole 34 of the wheel W and the center of the reference hole 46. As shown in FIG. 2b, the roller 228 and the proximity switch 214 are angularly spaced at an angle θ of 90 degrees with respect to the center of the wheel W. Three wheel support rollers 230a through 230c are rotatably supported by brackets 232a through 232c on the upper surface of the attachment plate 206 for rolling engagement with the peripheral edge of the hub 36 of the wheel W.

As shown in FIG. 4, the first loading robot 26 in the first machining station ST1 is basically composed of a vertical post 234 erected on one side of the transfer device 16, a cross table 236 movable along the post 234 in the direction of the arrow Y, a support body 238 movable with respect to the cross table 236 in the direction of the arrow Z, and two jig units 240a, 240b mounted on the support body 238. A motor 242 is mounted on the upper end of the post 234 and coupled to a ball screw 244 threadedly engaging the cross table 236. Therefore, when the motor 242 is energized, the cross table 236 is moved in the direction of the arrow Y along guide rails 246a, 246b mounted on the post 234. The support body 238 supports on one end thereof a motor 238 which, when energized, moves the support body 238 in the direction of the arrow Z with respect to the cross table 236. A bearing bracket 252 is mounted on the other end of the support body 238 by a joint 250.

On the bearing bracket 252, there is mounted a motor 254 having a drive shaft axially extending at 45 degrees with respect to the direction of the arrow Z. The jig units 240a, 240b directed in the directions of the arrows Y, Z, respectively, are joined to the bearing bracket 252 by a support 258. The jig units 240a, 240b have chuck fingers 260a through 260c and 262a through 262c for holding wheels W, and can be rotated in the direction of the arrow D upon energization of the motor 254.

The first machine tool 18 is disposed in confronting relation to the first loading robot 26. The first machine tool 18 essentially comprises a jig indexing unit 266 mounted on a bed 264, a first cutting unit 268 mounted on the bed 264, and a second cutting unit 270 mounted on the bed 264. The jig indexing unit 266 has a head 276 rotatable through 180 degrees in the direction of the arrow E by a motor (not shown) mounted in a support body 272. Two jig units 280a, 280b are rotatably mounted on the head 276 by respective shafts 278a, 278b in point symmetry. The jig units 280a, 280b have chuck fingers 282a through 282c and 284a through 284c, respectively, for holding wheels W, and are rotatable in the direction of the arrow F by respective motors 286a, 286b.

The first cutting unit 268 serves to machine the outer periphery of a wheel W on its inner side 42. The first cutting unit 268 comprises a vertical post 292 movable in the direction of the arrow Y along guide rails 290a, 290b on a support body 288 fixed to the bed 264, a tool indexing unit 294 mounted on the post 292 and movable in the direction of the arrow Z with respect to the post 292, and a tool holder 298 coupled to the tool indexing unit 294 by an indexing shaft 296. The tool holder 298 supports a plurality of tools 300 shaped to effect desired cutting processes, the tools 300 being indexable by the tool indexing unit 294. The second cutting unit 270 serves to machine the inner periphery of a wheel W on its inner side 42. The second cutting unit 270 comprises a vertical post 302 movable in the direction of the arrow Z along the support body 288, and a tool holder 304 mounted on the post 302 and movable in the direction of the arrow Y along the post 302. The tool holder 304 supports a plurality of tools 306 shaped to effect desired cutting processes.

Figure 7:
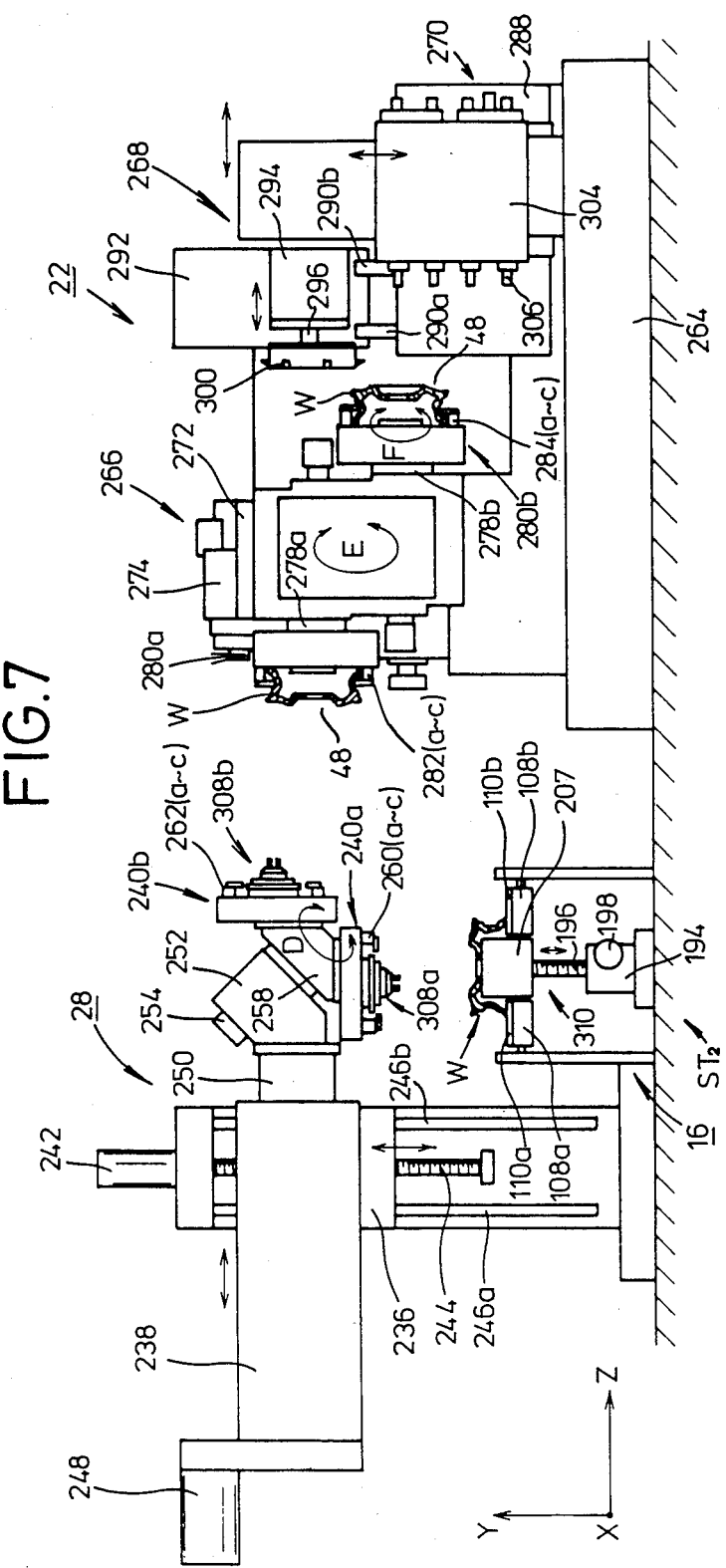
FIG. 7 is an elevational view of a second machining station shown in FIG. 1.

As shown in FIG. 7, the second machining station ST2 has the second loading unit 28 which has upper positioning mechanisms 308a, 308b for positioning wheels W, a lower positioning mechanism 310, and the second machine tool 22 for finishing the outer side 48 of a wheel W which has been delivered by the second loading robot 28. The upper positioning mechanisms 308a, 308b are mounted respectively on jig units 240a, 240b of the second loading robot 28. The second loading robot 28, the second machine tool 22, the upper positioning mechanisms 308a, 308b, and the lower positioning mechanism 310 are identical to the first loading robot 26, the first machine tool 18, the upper positioning mechanism 112, and the lower positioning mechanism 114 shown in FIG. 4, and will not be described in detail with their components denoted by identical reference characters.

Figure 8:
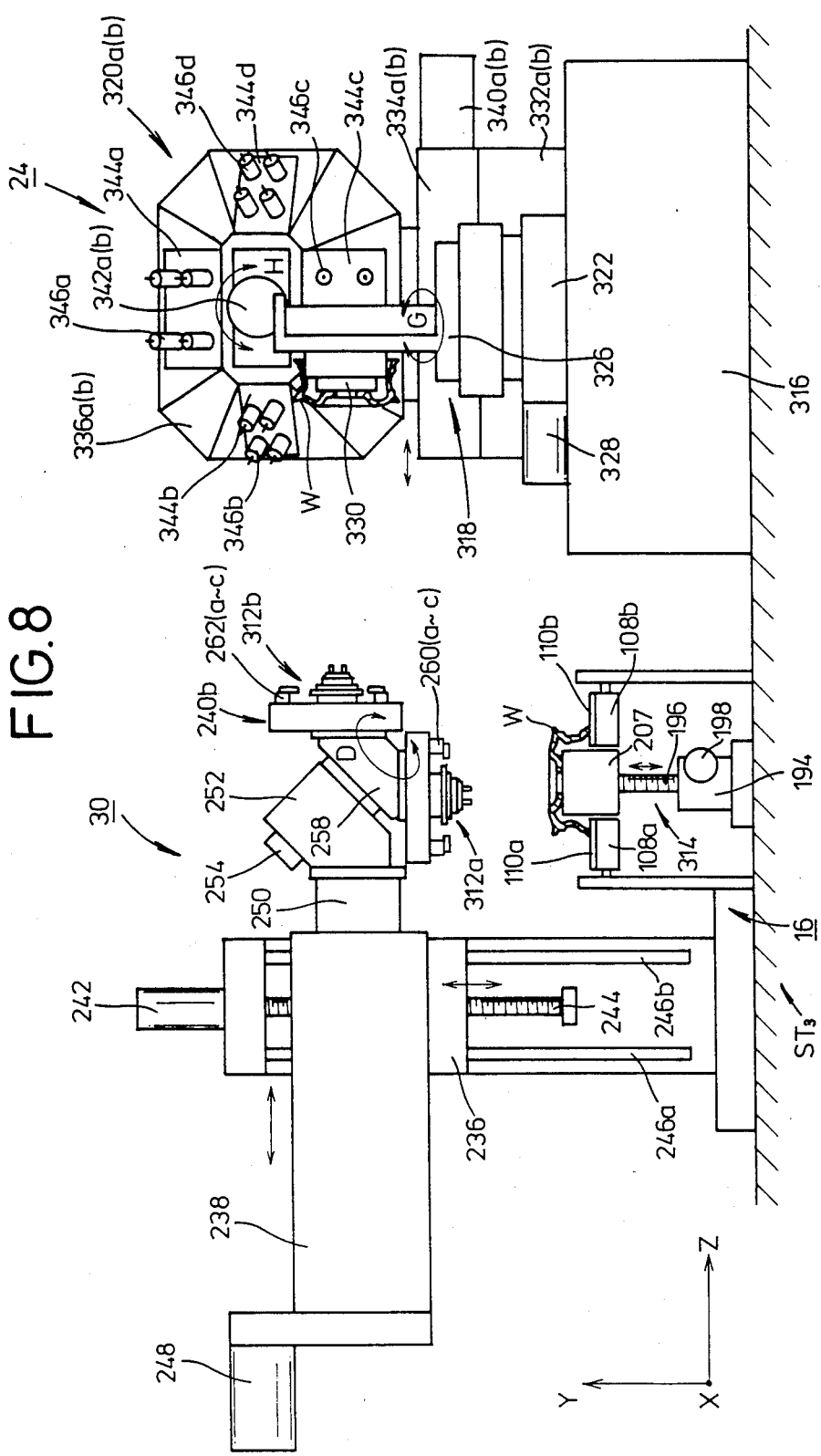
FIG. 8 is an elevational view of a second machining station shown in FIG. 1.

As illustrated in FIG. 8, the third machining station ST3 has the third loading robot 30 having upper positioning mechanisms 312a, 312b for positioning wheels W, a lower positioning mechanism 314, and the third machine tool 24 for defining recesses 50a through 50c as well as a reference hole 46 and also a valve hole in a wheel W which has been delivered by the third loading robot 30. The third loading robot 30, the upper positioning mechanisms 312a, 312b, and the lower positioning mechanism 314 are identical to the second loading robot 28, the upper positioning mechanisms 308a, 308b, and the lower positioning mechanism 310 shown in FIG. 7, and will not be described in detail with their components denoted by identical reference characters.

The third machine tool 24 comprises a jig unit 318 mounted on a bed 316, and first and second boring units 320a, 320b disposed on opposite sides of the jig unit 318 in confronting relation to each other. The jig unit 318 has a jig pallet 326 supported on a jig base 322 and rotatable in the direction of the arrow G by a motor 328 mounted on the jig base 322. The jig pallet 326 has a clamp 330 for positioning and holding a wheel W while it is being machined by the first and second boring units 320a, 320b.

The first and second boring units 320a, 320b have mobile tables 332a, 332b movable in the direction of the arrow X along the bed 316, and mobile tables 334a, 334b movable in the direction of the arrow Z along the mobile tables 332a, 332a. The mobile tables 332a, 332b and 334a, 334b are driven by respective motors 338a, 338b and 340a, 340b (see FIG. 1). Turret tool holders 336a, 336b are disposed respectively on the mobile tables 334a, 334b. On the turret tool holders 336a, 336b, there are mounted respective motors 342a, 342b having drive shafts inclined at 45 degrees with respect to the X axis for rotating the turret tool holders 336a, 336b about the drive shafts through 90 degrees in the direction of the arrow H. The turret holders 336a, 336b have four tool holding portions 344a, 344b which hold first through fourth tools 346a through 346d for effecting different machining processes such as spot facing, bevelling, boring, and the like on reference holes 46 and recesses 50a through 50c in wheels W and also for defining valve holes therein. The tools 346a through 346b are rotated by spindle motors 348a, 348b (see FIG. 1).

Operation and advantages of the workpiece transferring, positioning and machining system thus constructed will be described below.

Wheels W which have been formed by casting or forging are stored in the wheel stocker 12. The wheels W are stacked with their outer sides 48 up while the rods 56 mounted on the mobile base 54 extending through the axial holes 34. The mobile base 54 is then fed by the mobile base feeder 58 to deliver the wheels W to a prescribed position in the direction Z. The mobile base 54 is accurately positioned in the direction Z by the mobile base positioning device 64. The wheel pick-up robot 14 is then operated by the motor 70 to move the hand 90 to a prescribed position in the direction X. The motor 78 is energized to lower the hand 90 in the direction Y toward a certain wheel W, whereupon the cylinders 96a, 96b are actuated to cause the chuck fingers 94a, 94b to grip the wheel W (see FIG. 3).

The wheel pick-up robot 14 now transfers the gripped wheel W to the wheel charging station ST0 of the transfer device 16. The transfer device 16 is then operated by the motor 102 to enable the conveyor belts 110a, 110b to transfer the wheel W to the first machining station ST1.

Upon arrival of the wheel W at the first machining station ST1, the jig unit 126 of the wheel reversal robot 20 positioned above the transfer device 16 starts to be lowered toward the wheel W by the cylinders 116a, 116b (FIG. 5). The wheel W positioned by the upper positioning mechanism 112 in the wheel reversal robot 20 and the lower positioning mechanism 114 in the transfer device 16.

The manner in which the wheel W is positioned will be described with reference to FIG. 6.

When the support body 128 of the wheel reversal robot 20 is lowered a preset distance toward the wheel W, the centering piece 190 of the upper positioning mechanism 112 engages in the cavity 47 defined in the wheel W on its outer side 48. The tapered lower surface 192 of the centering piece 190 accurately positions the wheel W with respect to the wheel reversal robot 20 in the directions X and Z. With the centering piece 190 fitting in the cavity 47, the engaging pins 188a through 188c projecting downwardly from the lower surface of the centering piece 190 are pressed against the hub 36 of the wheel W under the resiliency of the coil springs 186a through 186c. Since the centering piece 190 is coupled to the drum 160 through the coil springs 180a through 180c, shocks produced when the centering piece 190 hits the wheel W are absorbed by the coil springs 180a through 180c.

At the time the upper positioning mechanism 112 engages the outer side 48 of the wheel W, the lower positioning mechanism 114 starts to be lifted by the motor 198 through the ball screw 196. The lower positioning mechanism 114 enters the inner side 42 of the wheel W between the rollers 108a, 108b of the transfer device 16, moving the centering piece 210 into the axial hole 34. As the centering piece 210 is further raised, the wheel supporting rollers 230a through 230c on the attachment plate 206 abut against the peripheral edge of the hub 36 on the inner side 42 to bear the wheel W. Upon upward movement of the lower positioning mechanism 114, the centering piece 190 of the upper positioning mechanism 112 is also elevated. As a result, the wheel W is securely gripped between the centering pieces 190, 210 under the resilient forces of the coil springs 180a through 180c.

Then, the motor 148 of the upper positioning mechanism 112 is energized. The driving force of the motor 148 is transmitted from the pulley 152 via the V-belt 168 to the drum 162 to rotate the centering piece 190 coupled to the drum 162 by the stopper pins 176a through 176c in the direction of the arrow C about the shaft 158. The engaging pins 188a through 188c slide along the hub 36 on the outer side 48 until one of the engaging pins 188a through 188c engages in the reference hole 46 or either one of the recesses 50a through 50c. Further energization of the motor 148 now rotates the wheel W in the direction of the arrow C through the engaging pins 188a through 188c.

The proximity switch 214 of the lower positioning mechanism 114 detects the reference hole 46 or the recesses 44a through 44d defined in the wheel W on the inner side 42. More specifically, when the reference hole 46 or the recesses 44a through 44d confront the proximity switch 214, the metallic surface of the wheel W is positioned away from the proximity switch 214, turning the proximity switch 214 off to detect that the reference hold 46 or the recesses 44a through 44d are present above the proximity switch 214.

The cylinder 218 is controlled such that when the proximity switch 214 is turned off by detecting the reference hole 46 or the recesses 44a through 44d, the positioning pin 224 is lowered downwardly in the direction Y, and when the proximity switch 214 is turned off by detecting the flat surface of the hub 36, the positioning pin 224 is lifted toward the wheel W. As shown in FIG. 2b, the roller 228 on the upper end of the positioning pin 224 and the proximity switch 214 are angularly spaced 90 degrees as described above. The recesses 44a through 44d of the wheel W are also angularly displaced 90 degrees. Therefore, when the reference hole 46 or the recesses 44a through 44d are being detected by the proximity switch 214, the positioning pin 224 is lowered and the roller 228 does not engage in the recesses 44a through 44d.

When the proximity switch 214 detects the flat surface of the hub 36, the positioning pin 224 is lifted by the cylinder 218. The roller 228 rolls along the hub 36 until it falls into the reference hole 46. Upon upward movement of the piston rod 220 for a prescribed stroke, the motor 148 is de-energized by a signal produced from a limit switch (not shown) mounted on the cylinder 218. As a consequence, the process of circumferentially positioning the wheel W is completed. The angular spacing $\theta$ between the proximity switch 214 and the roller 228 is not limited to 90 degrees but may be established appropriately dependent on the positional relationship between the recesses 44a through 44d.

Upon completion of the wheel positioning, the motor 138 in the support body 128 of the wheel reversal robot 20 is energized to cause the links 142, 144a, 144b to move the chuck fingers 134a through 134d on the holder plates 136a, 136b toward each other to grip the outer side 48 of the wheel W, as shown in FIG. 5. Then, the wheel reversal robot 20 is lifted by the cylinders 116a, 116b, followed by energization of the motor 122 to turn over the the jig unit 126 through 180 degrees in the direction of the arrow B. At this time, the jig unit 240a (FIG. 4) of the first loading robot 26 is positioned above the jig unit 126, so that the outer periphery of the wheel W on the inner side 42 is gripped by the chuck fingers 260a through 260c. After the holder plates 136a, 136b have been spaced from each other, the wheel reversal robot 20 is lowered a desired distance by the cylinders 116a, 116b.

The motor 254 of the first loading robot 26 is energized to turn the jig unit 240a through 180 degrees in the direction of the arrow D. Thereafter, the motors 242, 248 are energized to move the support body 238 toward the first machine tool 18.

The wheel W is then gripped by the chuck fingers 282a through 282c of the jig unit 280a in the jig indexing unit 266 of the first machine tool 18. Subsequently, the head 276 turns the jig unit 280a through 180 degrees in the direction of the arrow E. The motor 274 is then energized to rotate the jig unit 280a in the direction of the arrow F to start machining the wheel W. At this time, the first and second cutting units 268, 270 finish the inner side 42 of the wheel W, one outer periphery of the rim 32, the end face of the hub 36, and the axial hole 34.

When the machining operation of the first machine tool 18 is over, the jig unit 280a stops the wheel W in the same position as the position in which the wheel W has previously been positioned. Then, the wheel W is delivered back to the first loading robot 26 through a process which is opposite to the previous loading process, and is turned upside-down by the wheel reversal robot 20 before the wheel W is placed on the transfer device 16. The transfer device 16 transfers the wheel W to the second machining station ST2.

The first loading robot 26 and the first machine tool 18 have the pair of jig units 240a, 240b and the pair of jig units 280a, 280b, respectively. Therefore, the first loading robot 26 can efficiently deliver the wheel W before it is machined to the first machine tool 18, and deliver the wheel W after it is machined back to the transfer device 16. The first machine tool 18 is capable of continuously machining a wheel W while another wheel W is being received from or delivered back to the first loading robot 26.

In the second machining station ST2, the wheel W is positioned by the upper positioning mechanism 308a or 308b and the lower positioning mechanism 310 in the second loading robot 28, and thereafter the wheel W is delivered by the second loading robot 28 to the second machine tool 22 (see FIG. 7). Inasmuch as the wheel W is not reversed or turned upside-down at this time, the wheel W is finished on its outer side 48 by the second machine tool 22. Specifically, the first and second cutting units 268, 270 of the second machine tool 22 finish the outer side 48 of the wheel W and the other periphery of the rim 32.

Upon completion of the machining process of the Second machine tool 22, the wheel W is stopped in the same position as the position in which it has previously been positioned, and is moved back to the second loading robot 28. Thereafter, the wheel W is delivered by the transfer device 16 to the third machining station ST3.

In the third machining station ST2, the wheel W is positioned by the upper positioning mechanism 312a or 312b and the lower positioning mechanism 314 in the third loading robot 30, and thereafter the wheel W is delivered to the third machine tool 24 (see FIG. 8). After the wheel W has been positioned on the jig pallet 326 of the jig unit 318 in the third machine tool 24, the jig pallet 326 is turned 90 degrees in the direction of the arrow G by the motor 328. Then, the reference hole 46 and the recesses 50a through 50c are bored to define fastening holes in the wheel W by the first and second boring units 320a, 320b which is positioned in confronting relation to the jig unit 318. The first and second boring units 320a, 320b have the turret tool holders 336a, 336b which can be indexed through increments of 90 degrees by the motors 342a, 342a. Therefore, the opposite sides of the wheel W are finished for spot facing, bevelling, boring, or the like by the first through fourth tools 346a through 346d mounted on the tool holders 336a, 336b.

After the wheel W has been machined by the third machine tool 24, the jig pallet 326 is turned an angle of $\phi$ with respect to the direction Z, and then a valve hole 49 is defined in the wheel W by the first through fourth tools 346a through 346d, as shown in FIG. 9.

The wheel W with the fastening holes and valve hole 49 defined therein is then placed on the transfer device 16 by the third loading robot 30. The wheel W is thereafter delivered to a wheel discharging station ST4 from which the wheel W is supplied to a next assembling station.

With the present invention, as described above, the workpiece is delivered from the stocker and transferred by the transfer device to a prescribed position, and thereafter the workpiece is positioned by the positioning device disposed in the prescribed position and then delivered to the machine tool by which the workpiece is machined. Therefore, it is not necessary to provide a positioning jig which would be associated with each workpiece being transferred. The workpieces can be accurately positioned by the minimum positioning device and supplied to the machine tools. Since the required positioning device is minimized, the cost of equipment needed is lowered, and the machining or production line is made smaller in size. The positioning device is composed of the detector means for detecting surface irregularities of the workpiece and the positioning pin displaceable in response to a detected signal from the detector means for engaging a prescribed portion of the wheel as it is turned. Therefore, the positioning pin is prevented from interference with the surface irregularities of the workpiece and hence from damage or breakage while engaging and positioning the workpiece. Accordingly, the positioning device can position workpieces of different shapes.

Although a certain preferred embodiment has been shown and described, it should be understood that many changes and modifications may be made therein without departing from the scope of the appended claims.

What is claimed is:

1. A system for transferring, positioning and machining a workpiece, comprising:
   a transfer device for transferring the workpiece to a prescribed position;
   a positioning mechanism disposed in the prescribed position for positioning the workpiece;
   a machine tool for machining the workpiece; and
   a loading robot operatively disposed adjacent to the prescribed position for delivering the workpiece to the machine tool;
   said positioning mechanism comprises:
      a holder mechanism for holding the workpiece;
      turning means of turning the workpiece;
      detector means disposed near the workpiece for detecting the workpiece as it si turned closely to or away from the detector means and for generating a detected signal;
      a positioning pin displaceable toward the workpiece for engaging a portion of the workpiece; and
      displacing means responsive to the detected signal from the detector means for displacing the positioning pin toward or away from the workpiece.

2. A system according to claim 1, wherein the turning means is mounted on the holder mechanism for turning the workpiece with respect to the holder mechanism.

3. A system according to claim 1, wherein said positioning pin engages a reference positioning hole in said workpiece.

4. A system according to claim 1, wherein the workpiece has a hole at its center of turning movement, and the holder mechanism has an engaging portion for engaging in the hole.

5. A system according to claim 1, wherein the positioning mechanism comprises a first positioning mechanism operatively positioned relative to the transfer device, and a second positioning mechanism operatively positioned relative to the loading robot for cooperating with the first positioning mechanism in positioning the workpiece.

6. A system according to claim 5, wherein the turning means turns one of the first and second positioning mechanisms to displace the workpiece for positioning the workpiece with respect to the other positioning mechanism.

7. A system according to claim 5, wherein one of the positioning mechanisms has an engaging pin for engaging the workpiece and the other positioning mechanism has the detector means and the positioning pin.

8. A system according to claim 7, wherein the detector means and the positioning pin are located at an angular spacing in an range in which the reference positioning hole is moved by the positioning mechanism.

9. A system according to claim 8, wherein the angular spacing between the detector means and the positioning pin is equal to an angular spacing between recesses defined in the range of movement of the reference positioning hole, the displacing means being arranged to displace the positioning pin away from the workpiece when the detector means detects the recesses and to displace the positioning pin toward the workpiece when the detector means detects the recesses.

10. A system according to claim 5, wherein the loading robot comprises posture changing means having the second positioning mechanism for changing the posture of the workpiece, and delivery means for gripping the workpiece with its posture changed by the posture changing means and delivering the workpiece to the machine tool.

11. A system according to claim 10, wherein the delivery means has a plurality of jig units displaceable toward the machine tool while holding the workpiece.

12. A system according to claim 11, wherein the jig units include a first jig unit directed toward the posture changing means and a second jig unit directed toward the machine tool, the first and second jig units being positionally interchangeable with each other.

13. A system according to claim 5, wherein the loading robot includes a plurality of jig units displaceable toward the machine tool while holding the workpiece.

14. A system according to claim 13, wherein the jig units include a first jig unit directed toward the posture changing means and a second jig unit directed toward the machine tool, the first and second jig units being positionally interchangeable with each other.

15. A system according to claim 1, wherein the machine tool comprises first and second machining portions disposed in confronting relation to each other for machining the workpiece, and jig units disposed between the first and second machining units and directable respectively toward the loading robot and the first and second machining portions while holding the workpiece.

16. A system according to claim 1, wherein the machine tool includes a jig unit having first and second jigs directed toward the loading robot and the machining tool, respectively, the first and second jigs being positionally interchangeable with each other while holding the workpiece.

17. A system according to claim 16, wherein the machining tool comprises a plurality of machining portions having a plurality of replaceable tools for simultaneously machining a plurality of areas of the workpiece

* * * * *